United States Patent [19]

Buhl et al.

[11] Patent Number: 5,680,792
[45] Date of Patent: Oct. 28, 1997

[54] CONCENTRIC DRIVE BEARINGS FOR ACTUATING TWO ACTUATOR RODS FOR A WINDSCREEN WIPER SYSTEM

[75] Inventors: Harro Buhl, Kirchheim; Bruno Egner-Walter, Heilbronn; Peter Fein, Leonberg; Robert Klinar, Bietigheim-Bissingen, all of Germany

[73] Assignee: ITT Automotive Europe GmbH, Germany

[21] Appl. No.: 505,225

[22] PCT Filed: Feb. 16, 1994

[86] PCT No.: PCT/EP94/00439

§ 371 Date: Aug. 15, 1995

§ 102(e) Date: Aug. 15, 1995

[87] PCT Pub. No.: WO94/19220

PCT Pub. Date: Sep. 1, 1994

[30] Foreign Application Priority Data

Feb. 20, 1993 [DE] Germany ............ 43 05 304.1

[51] Int. Cl.[6] ............ B60S 1/18; F16C 11/06
[52] U.S. Cl. ............ 74/42; 15/250.31; 384/208; 384/901; 403/56; 403/128; 403/135
[58] Field of Search ............ 74/42; 15/250.31; 384/901, 208, 206; 403/56, 135, 132, 128; 29/898.05, 898.049, 898.048

[56] References Cited

U.S. PATENT DOCUMENTS

| 3,441,300 | 4/1969 | Chow . | |
|---|---|---|---|
| 3,749,431 | 7/1973 | Schmid et al. | 287/90 R |
| 4,009,502 | 3/1977 | Tamaki et al. | 15/250.31 X |
| 5,209,140 | 5/1993 | Eustache et al. | 74/42 X |
| 5,473,955 | 12/1995 | Stinson | 74/43 |

FOREIGN PATENT DOCUMENTS

| 181411 | 5/1986 | European Pat. Off. | 403/132 |
| 0316832 | 11/1988 | European Pat. Off. . | |
| 399811A2 | 11/1990 | European Pat. Off. . | |
| 2030879 | 11/1970 | France . | |
| 2222893 | 10/1974 | France . | |
| 3241551 | 5/1984 | Germany | 15/250.31 |
| 3347441 | 7/1985 | Germany . | |
| 3900230 | 7/1989 | Germany | 15/250.31 |
| 245824 | 12/1985 | Japan | 403/132 |
| 383900 | 11/1932 | United Kingdom . | |

OTHER PUBLICATIONS

English translation of the International Preliminary Examination Report for Appln PCT/EP94/00439 filed Feb. 16, 1994.

Primary Examiner—Charles A. Marmor
Assistant Examiner—Troy Grabow
Attorney, Agent, or Firm—J. Gordon Lewis; Thomas N. Twomey

[57] ABSTRACT

A drive bearing for a windscreen wiper system wherein two actuator rods for actuating two wiper arms are driven by a motor crank. The two bearings are concentrically nested one within the other thereby allowing the driving forces of the two rods to extend in one plane. Other features include the association of the individual bearing elements to the actuator elements, and the design of the bearing faces.

8 Claims, 1 Drawing Sheet

CONCENTRIC DRIVE BEARINGS FOR ACTUATING TWO ACTUATOR RODS FOR A WINDSCREEN WIPER SYSTEM

TECHNICAL FIELD

The present invention relates to gears for coupling actuator rods for actuating windscreen wipers to a driving shaft.

BACKGROUND OF THE INVENTION

In windscreen wipers it is frequently desirable to actuate two wiper arms by a common electromotor. As the driving shaft of the electromotor performs a rotating movement the same will have to be converted into an oscillating movement for actuating the wiper arms. This, as a rule, is effected with the aid of one or more crank levers and actuator rods associated thereto.

EP-OS 399 811 teaches to actuate two wiper arms in parallel by a common electromotor. According to DE-OS 3 347 441 two ball bolts are provided on a crank rod. Corresponding provisions are suggested by EP-OS 316 832 disclosing dual ball bolts serving to hinge push rods to a lever.

A disadvantage involved with designs of the aforementioned type resides in that such dual ball bolts require a relatively large assembly and operating space which, frequently, is not available especially in the front structure of a motor vehicle. In addition, the state-of-the-art dual ball bolts projecting in two different directions will have to be sufficiently strong in order to take up the lever forces occurring thereby.

It is an object of the invention to provide a gear which is particularly flat and, hence, offering assembly and operating space-saving advantages. Beyond that, the force for driving several wiper arms is focused on one point only to reduce the load on the wiper drive, with the forces of the actuated rods extending in one plane.

This is accomplished by tapping the force required for actuating the two wiper arms from a common point. Hence, the force can be distributed through the actuator rods within a common plane which will result in substantially reduced space requirements and also in avoiding lever forces likely to have an adverse effect on the transmission of power.

A particularly simple solution in which the two actuator rods are given a substantially equivalent treatment with respect to one another regarding the operation thereof, is provided in a preferred embodiment in which the two bearing rings of the actuator rods are centrally nested with respect to one another and are commonly seated on the bearing bolt fixed to the motor crank.

To the extent that the geometric conditions do not permit an arrangement of this type it is advisable to use the combination of features shown in a second embodiment wherein one of the two actuator rods carries the bearing bolt whereas the motor crank is preferably arranged on the outer bearing ring, thereby embracing the bearing ring of the second actuator rod. The association of motor crank and second actuator rod can be exchanged so that the inner bearing ring can be connected to the motor crank and the outer bearing ring can be in communication with the second actuator rod.

In a variety of cases it may be adequate for the bearing rings to embrace one another or the ball bolt only in part, thereby resulting in a simplified assembly of the gear. If the gear is intended for accommodating strong forces it is preferred that the planes of symmetry of the two bearing rings are mating and/or the bearing bushes are embracing the bearing bolt and the second bearing bush, respectively, within a closed ring.

In order to accommodate, in a particularly simple manner, forces acting in the longitudinal direction of the bearing bolt to thereby avoid a separate lock acting in that direction, it is recommended to use bearing faces which are curved in the axial direction of the bearing bolt so that the first bearing ring surrounds the bearing bolt and the second bearing ring surrounds the first bearing ring in a way curved in the axial direction of the bolt, thereby forming faces in the longitudinal direction of the bolt. These faces undercut the bearing bolt and the outer face of the first bearing ring, respectively, thereby taking up a force acting in the axial direction of the bearing bolt.

In a preferred embodiment, the bearing faces, hence, form respectively annular sections of a ball face.

DETAILED DESCRIPTION OF THE PREFERRED EMBODIMENTS

Figure 1:
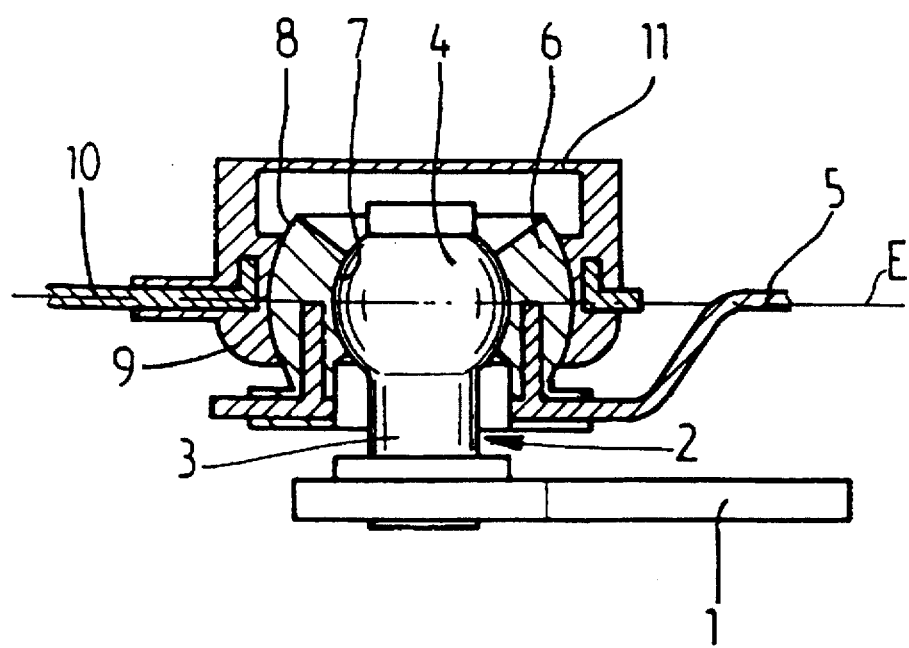
FIG. 1 shows a first form of embodiment of the invention.

Now, referring to the drawings, FIG. 1 shows the outer end section of a motor crank 1 to which is suitably and non-detachably secured a bearing bolt 2 so that the motor crank and the bearing bolt form a mechanical unit. The bearing bolt protrudes with the bolt shaft 3 thereof through the motor crank 1 while in the end area thereof facing away from the motor crank 1 it passes to a substantially ball-shaped bolt head 4.

A first actuator rod 5 is connected in a suitable way to a first bearing ring 6 which annularly surrounds the bolt head 4. The inner bearing face 7 of the first bearing ring 6 is curved to conform to the ball-shaped surface of the bolt head 4 in order to permit, on the one hand, a certain oscillating movement of the first actuator rod 5 with respect to the bolt head and, on the other hand, to have available a lock against forces tending to displace the bearing ring 6 with respect to the bolt head 4 in the longitudinal direction of the bolt shaft 3. In the form of embodiment as shown in FIG. 1 the actuator rod 5 is integrally cast with the first bearing ring 6. The actuator rod 5 of FIG. 1 has an axially extending portion 12 over which first being ring 6 is disposed. First bearing ring 6 extends over both sides of a flange portion 14 of actuator rod 5. However, in the practice of the invention, also other types of non-detachable fixations are permitted.

Moreover, the first bearing ring 6, has a ball-type outer face 8 serving as a bearing face for a second bearing ring 9. The curvature of the ball-shaped inner face of the second bearing ring 9 conforms to that of the outer face 8 of the first bearing ring 6, with the second bearing ring 9 fully embracing the first bearing ring 6 in the plane. The same applies to the first bearing ring 6 with respect to the bolt head 4.

A second actuator rod 10 is non-detachably connected to the second bearing ring 9 by casting. To obtain an enhanced strength of the second bearing ring and to seal the dual bearing, a lid 11 is provided integrally formed with the second bearing ring 9. The second actuator rod 10 of FIG. 1 has an axially extending portion 13 over which second bearing ring 9 is disposed. Second bearing ring 9 extends over both sides of a flange portion 15 of actuator rod 10.

As conveyed by FIG. 1, the first and second actuator rods 5 and 10 are arranged substantially in the same plane E. Plane E passes through a center of the bolt head.

Figure 2:
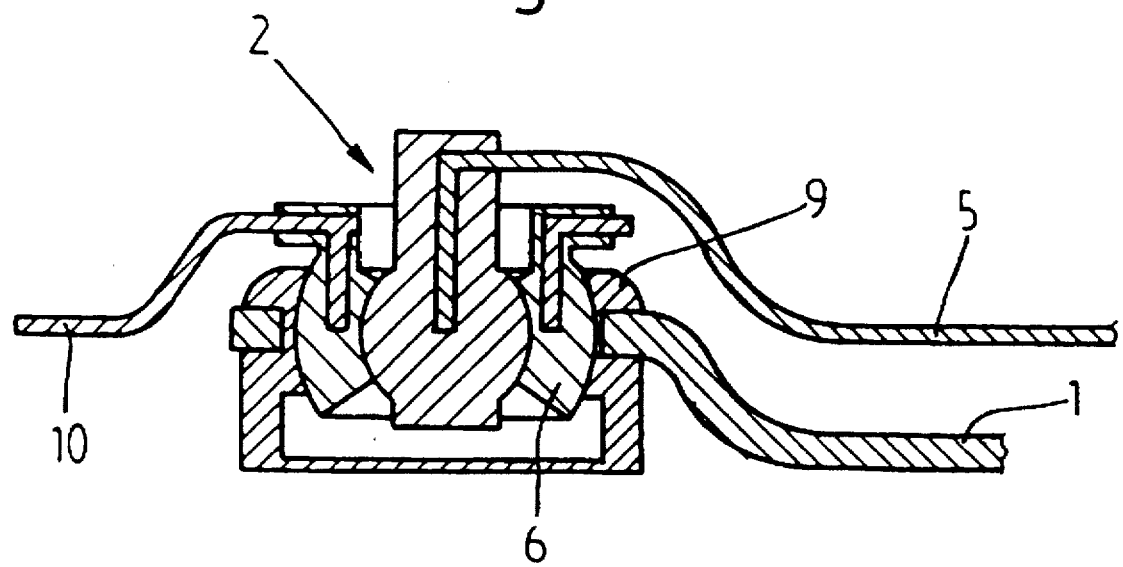
FIG. 2 shows a second form of embodiment of the invention.

This will also apply to the form of embodiment according to FIG. 2. The essential difference between the design according to FIG. 1 and FIG. 2 resides in that according to FIG. 2 the motor crank 1 engages the second bearing ring 9, i.e. at the outermost side of the bearing, whereas according to FIG. 1 the motor crank 1 is connected to the inner bearing bolt 2. In FIG. 2, inner bearing bolt 2 is disposed over axially extending portion 12, and first bearing ring 6 is disposed over axially extending portion 13. Second bearing ring 9 is disposed over both sides of a flange portion 16 of motor crank 1. In the examples of embodiment, the first bearing ring 6 is always in communication with an actuator rod. However, this is not imperative in the practice of the invention. The motor crank 1 can, if so desired, also engage the first bearing ring 6. In the practice of the invention, the associations between crank and actuator rod also in other respects can be randomly exchanged in that, for example, the second actuator rod 10 engages the bearing bolt 2 and the first actuator rod 5 engages the first bearing ring 6.

We claim:

1. A coupling for coupling a pair of windshield wiper actuator rods to a motor crank, the coupling comprising:

a motor crank;

a first actuator rod;

a second actuator rod;

a bearing bolt having a ball shaped head fixed to one of the motor crank, first actuator rod, or second actuator rod;

a unitary first bearing ring having a spherical inner surface conforming to and in engagement with the ball shaped head of the bearing bolt on both sides of a plane passing through a center of the ball shaped head parallel to at least one of the actuator rods thereby resisting removal from the ball shaped head, the first being ring being non-removable fixed to one of the motor crank, first actuator rod, or second actuator rod to which the bearing bolt is not fixed, the first bearing ring also having a spherical outer surface concentric with the inner surface; and a unitary second bearing ring having a spherical inner surface conforming to and in engagement with the spherical outer surface of the first bearing ring on both sides of the plane passing through the center of the ball shaped head thereby resisting removal from the first bearing ring, the second bearing ring being non-removable fixed to one of the motor crank, first actuator rod, or second actuator rod to which neither the bearing bolt nor the first bearing ring is fixed.

2. A coupling as claimed in claim 1, wherein:

the one of the motor crank and the first or second actuator rods to which the first bearing ring is non-removably fixed has an integrally formed axially extending portion over which the first bearing ring is disposed.

3. A coupling as claimed in claim 2, wherein:

the first bearing ring includes a portion disposed on opposite sides of a flange portion of the one of the motor crank and the first or second actuator rods to which the first bearing ring is fixed, thereby providing axial resistance to separation of the first bearing ring from the one of the motor crank and the first or second actuator rods to which the first bearing ring is fixed.

4. A coupling as claimed in claim 1, wherein:

the first bearing ring includes a portion disposed on opposite sides of a flange portion of the one of the motor crank and the first or second actuator rods to which the first bearing ring is fixed, thereby providing axial resistance to separation of the first bearing ring from the one of the motor crank and the first or second actuator rods to which the first bearing ring is attached.

5. A coupling as claimed in claim 1, wherein:

the second bearing ring includes an opening through which the bearing bolt extends and an integrally formed lid disposed on a side opposite the opening in the first bearing ring.

6. A coupling as claimed in claim 3, wherein the second bearing ring includes an opening through which the bearing bolt extends and an integrally formed lid disposed on a side opposite the opening in the first bearing ring.

7. A coupling as claimed in claim 1, wherein the bearing bolt is fixed to the motor crank and the first bearing ring is fixed to the first actuator rod and the unitary second bearing ring is fixed to the second actuator rod.

8. A coupling as claimed in claim 1, wherein the bearing bolt is fixed to the first actuator rod, the first bearing ring is fixed to the second actuator rod, and the second bearing ring is fixed to the motor crank.

* * * * *

UNITED STATES PATENT AND TRADEMARK OFFICE
CERTIFICATE OF CORRECTION

PATENT NO. : 5,680,792
DATED : 10/28/97
INVENTOR(S) : Buhl et al

It is certified that error appears in the above-indentified patent and that said Letters Patent is hereby corrected as shown below:

On column 3, line 35 change "being" to --bearing--.

Signed and Sealed this

Seventeenth Day of February, 1998

Attest:

BRUCE LEHMAN

Attesting Officer

Commissioner of Patents and Trademarks